Oct. 12, 1948.                T. R. ELLERBECK                2,451,024
                METHODS OF CALCINING AND CALCINING APPARATUS
Filed April 7, 1942                                    5 Sheets-Sheet 1
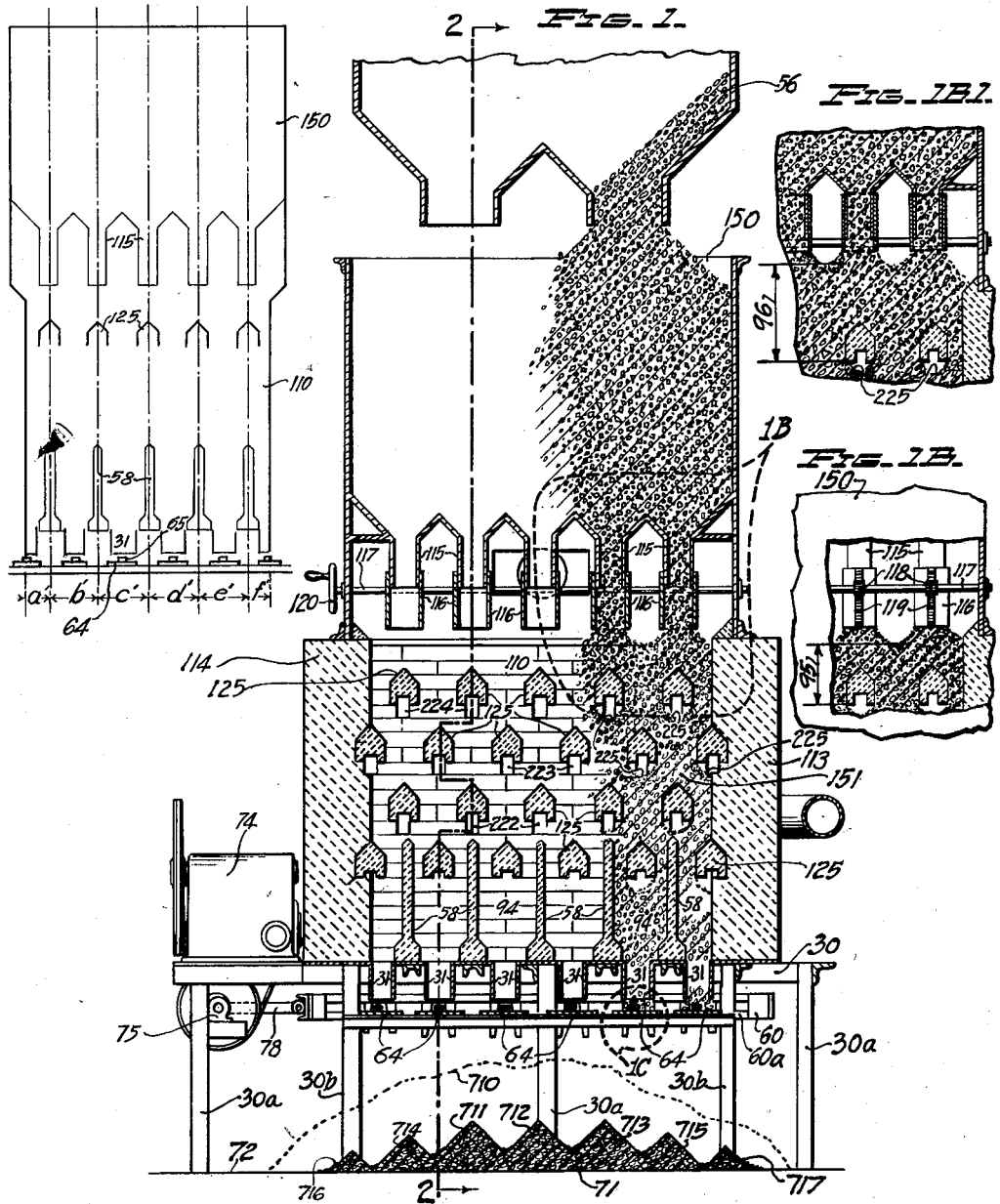
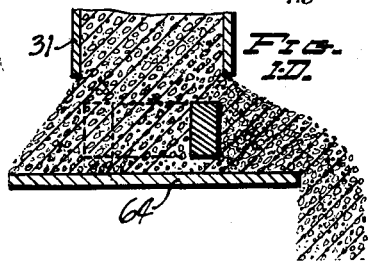
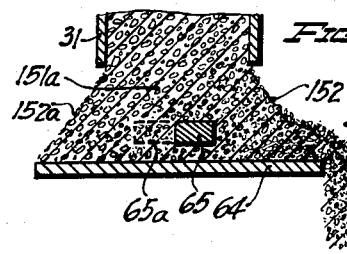
Inventor:
T. R. ELLERBECK,
Attorneys.

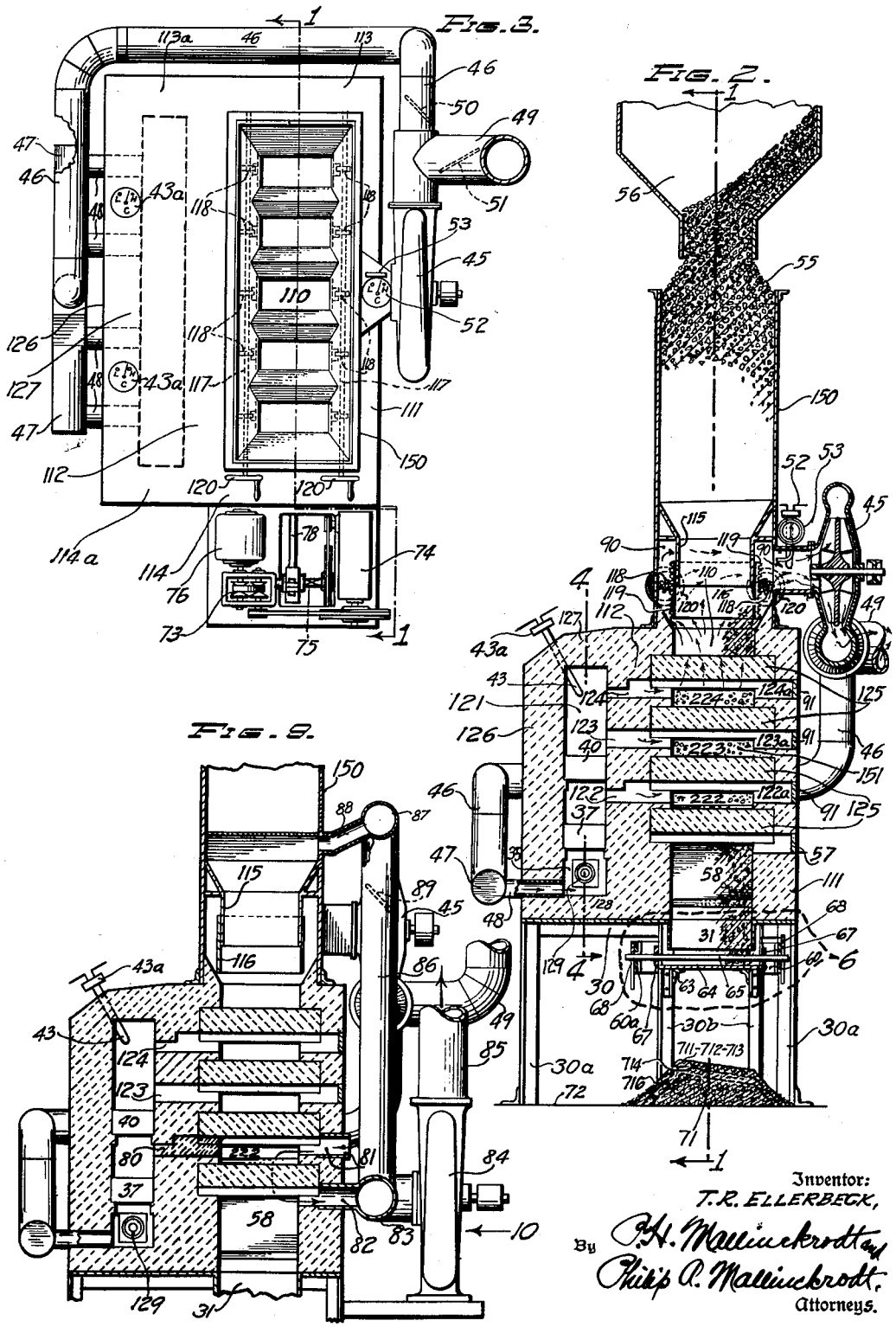

Oct. 12, 1948.  T. R. ELLERBECK  2,451,024
METHODS OF CALCINING AND CALCINING APPARATUS
Filed April 7, 1942  5 Sheets-Sheet 3
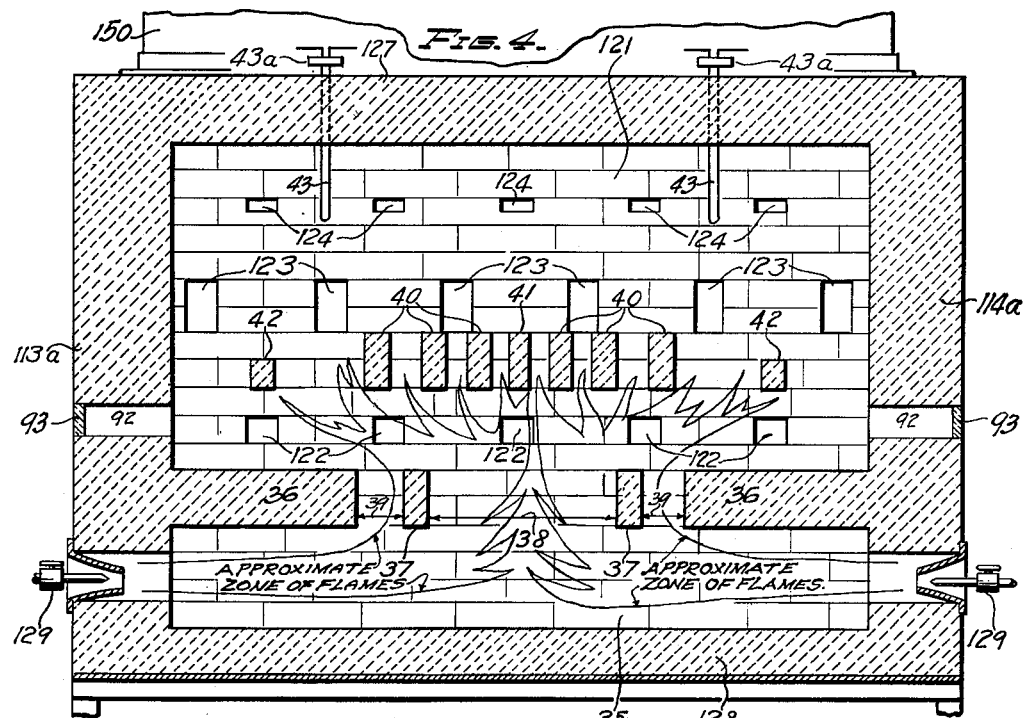
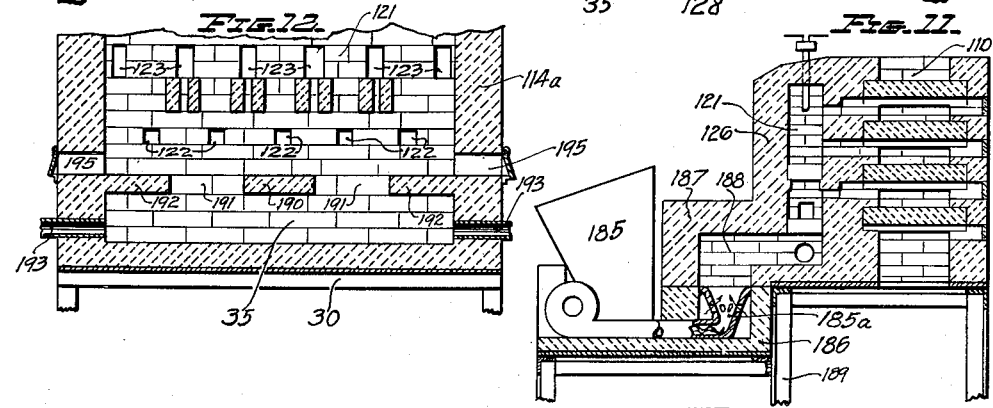
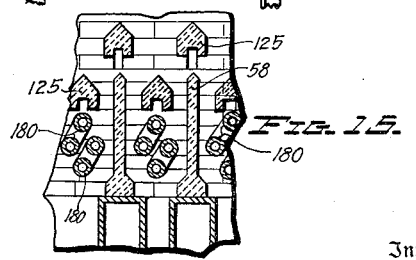
Inventor:
T. R. ELLERBECK,
By P. H. Mallinckrodt and
Philip A. Mallinckrott,
Attorneys

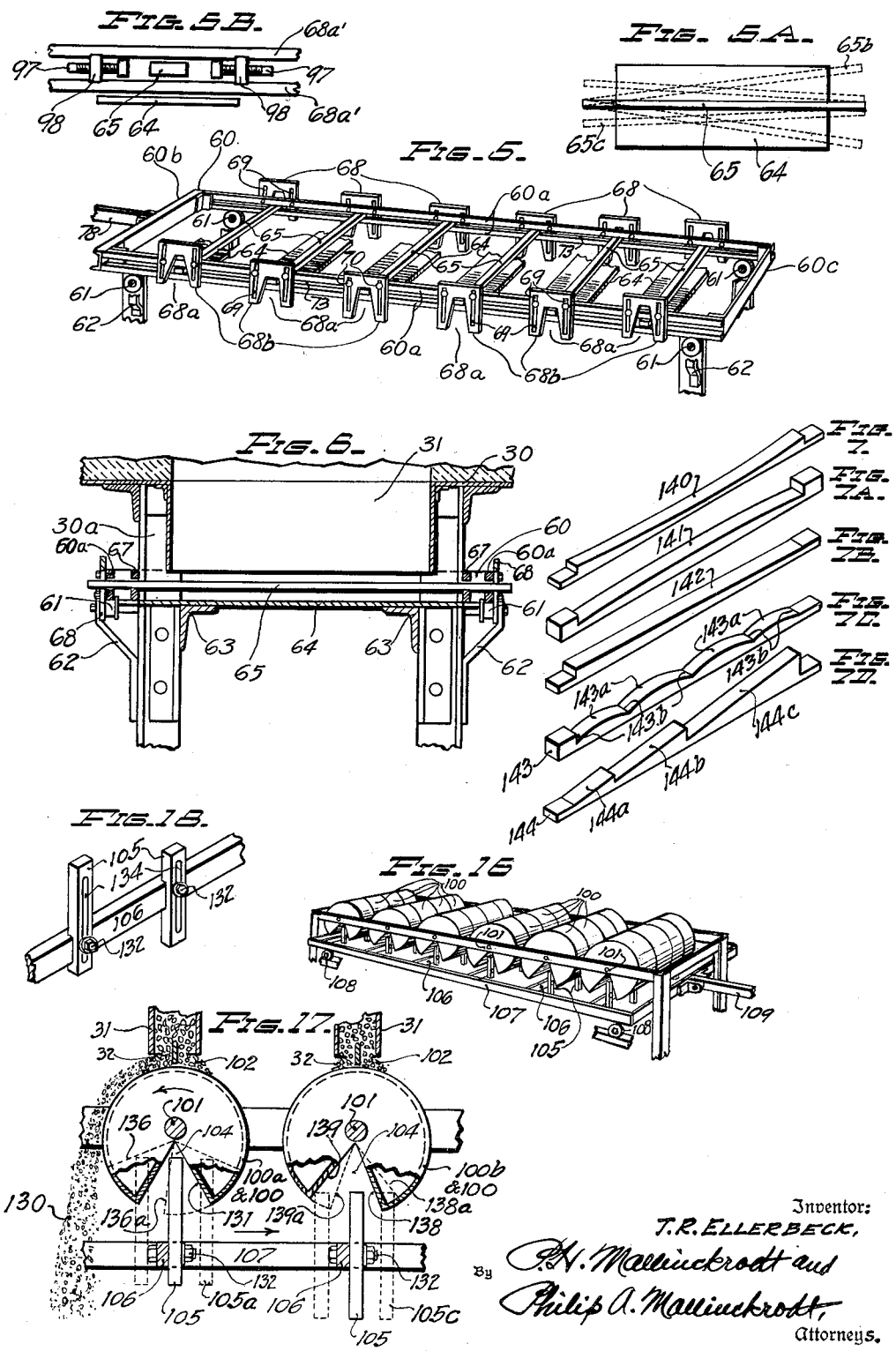

Oct. 12, 1948. T. R. ELLERBECK 2,451,024
METHODS OF CALCINING AND CALCINING APPARATUS
Filed April 7, 1942 5 Sheets-Sheet 5
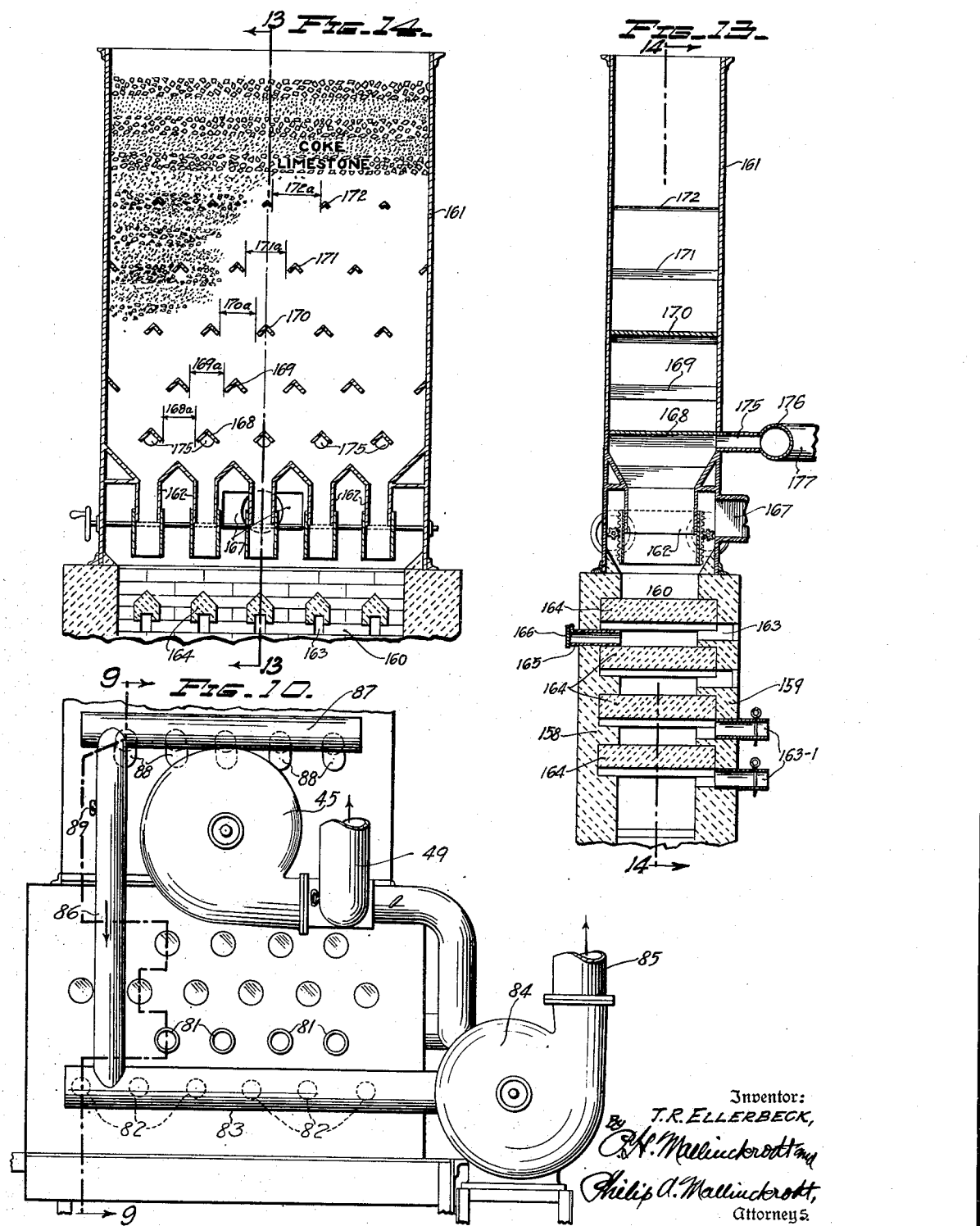
Inventor:
T. R. ELLERBECK,
Attorneys.

Patented Oct. 12, 1948

2,451,024

UNITED STATES PATENT OFFICE 2,451,024

METHOD OF CALCINING AND CALCINING APPARATUS

Thomas R. Ellerbeck, Salt Lake City, Utah

Application April 7, 1942, Serial No. 438,047

27 Claims. (Cl. 263—29)

This invention relates to methods of calcining and to calcining apparatus, and more particularly to improvements therein.

In the burning of limestone and in the roasting of metalliferous ores for bringing about chemical changes therein, as well as in other calcining practice, it is customary to charge a substantially vertical heating chamber from the top with the raw material to be treated, and to withdraw the more or less completely calcined or roasted material from the lower part of the heating chamber.

There are many types of lime kilns, roasting furnaces, retorts, or the like, which provide for continuous feed of the raw material and for continuous discharge of the calcined or roasted material, but, so far as I am aware, in none of these are there considered those differential temperatures, existing at various locations within the heating chamber, which causes lack of uniformity in the quality of the discharged product.

In order to produce a high grade lime, it is necessary that the calcining procedure be carefully regulated, and, in any calcining operation, careful regulation results in distinct advantages, such as economy of operation, quality of product, and so on.

Among the objects of the invention are the following:

First, to control the calcining operation and the characteristics of the calcined product while treating a continuous flow of material.

Second, to provide apparatus that is comparatively economical to operate and to maintain in good running condition, that requires little supervision, and in which necessary adjustments can be easily made without shut-downs.

Third, to satisfactorily handle relatively small particles of material, say from approximately ¼-inch mesh up to approximately 2-inch mesh, without, however, being restricted to such sizes.

Fourth, to reduce heat losses to a minimum.

Fifth, to temper, that is, to control the temperature of heating gases as desired before allowing them to contact the material to be calcined, and, when desired, to maintain the calcining temperatures substantially uniform throughout any given calcining operation.

Sixth, to cool the calcined material to handling temperatures before discharge.

Seventh, to eliminate, or at least to reduce to a minimum, air infiltration with material feed.

Eighth, to accomplish calcination of material in individual and independent units of small capacities as compared to ordinary calcining units which are almost invariably of large size.

Ninth, to insure a constant and steady feed of the raw material to be calcined, over substantially the entire transverse sectional area of the heating or calcining zone.

Tenth, to regulate the rate of discharge of the calcined material from the heating or calcining zone, differentially, substantially in accordance with the relative progress of calcination, differentially, within such heating or calcining zone.

Eleventh, to prevent packing of the material as it travels through the kiln or furnace.

Twelfth, to calcine limestone in a continuous gravity flow so as to produce a high quality lime.

Thirteenth, to produce, during the calcining operation, a high quality $CO_2$ gas, and to recover the same as a by-product.

Fourteenth, to produce, as a result of the calcination process, a lime product having a high available CaO content.

Fifteenth, to provide apparatus that is relatively inexpensive to construct.

The method of the invention concerns, for the most part, the passage of material to be calcined through a calcining zone in a substantially continuously moving stream. Since it is ordinarily very difficult, and in many instances impossible, to maintain the same quantity of available heat throughout all parts of a calcining zone, an important step in the method involves passing fractional portions of the stream of material through the calcining zone at mutually different rates of speed, the various rates being determined by the various mutually different quantities of heat available at different parts of the calcining zone. Thus, those portions of the stream which pass through any part of the calcining zone which is becoming too hot, are made to travel faster, thereby preventing the temperature of such part from rising unduly. Similarly, those portions of the stream which pass through any part of the calcining zone which is becoming too cool, are made to travel slower. Thus, the temperature of the material throughout the calcining zone is maintained uniform.

Preferred steps in the method concern the creation and maintenance of the calcining zone at temperatures within certain prescribed limits. High temperature gases of combustion are produced outside the calcining zone, and are tempered, i. e. reduced in temperature, as desired prior to being passed through the calcining zone.

Other objects, too, will become apparent after the invention is more fully understood.

With respect to the apparatus of the invention, outstanding features reside in the structural characteristics of variable discharge mechanism for differentially regulating the flow of material through the calcining zone, and in the structural characteristics and placement of the combustion chamber for tempering or conditioning the hot gases which are passed through the material to be calcined in the calcining chamber.

Wherever materials consisting of massed particles are to be heated or cooled, one of the most efficient methods of heat transfer is to conduct hot or cold gases directly through the mass of the material. In this way the body of the material acts largely as a heat filter, and because of the extensive total surface exposed to the gases in their travel through irregular and sinuous passages, the heat is rapidly extracted from either the gases or the material, as the case may be.

Masses of material in themselves tend to become packed, and, to prevent such a condition, certain mechanical features of the invention are designed to keep the material in the calcining chamber, as it passes through the kiln, in a very loose condition. These features include a plurality of baffles, more particularly described later herein, which also act as weight-supporting members. This makes possible the direct heat treatment of granular material of small size, say ¼-inch mesh to 2-inch mesh, without using excessively high induced draft. It is to be understood that the method herein disclosed is not necessarily restricted to materials of any particular size or sizes.

In most previous devices where direct heat treatment has been attempted for granular material of small size, it has been neecssary to resort to the use of excessively high draft in order to maintain the flow of gases through the material. This has added greatly to the cost of the process.

In calcining limestone and many other materials, standard practice is to use a combustion flame which has a very high temperature compared with the temperature to which the material is actually to be heated. It also is standard practice to have the combustion flame enter the calcining chamber, and so, to come into direct contact with the material being treated. This is especially true of vertical shaft kilns. Rotary kilns chiefly employ high-temperature radiated heat, and thus have high-temperature calcining zones.

An attempt is made, in standard practice, to pass the material through the excessively high-temperature calcining zone fast enough so that the material is heated only to the desired temperature in passing through this zone. Such a treatment might possibly be satisfactory if each and every particle of the material being treated were of identical size and shape. However, in actual practice, the gradation in sizes of the material treated simultaneously, will show considerable variation, as for example, ¼-inch mesh to 1½-inch mesh in rotary kilns, and 3-inch size to 8-inch size in vertical kilns.

It is to be remembered that when a material composed of mixed sizes passes through a calcining zone in counter-flow to hot gases of excessively high temperature, the smaller pieces become completely calcined sooner than do the larger pieces. Since the larger pieces must be kept in the calcining zone until they are completely calcined, it follows that the temperature of the smaller pieces is unavoidably raised to a point greatly in excess of the required calcining temperature. In calcining materials such as lime, gypsum, and so on, this becomes a very undesirable condition and seriously impairs the quality of the finer material. In some cases it even ruins the finer part of the final product.

By means of the combustion and tempering chamber of my invention, the calcining gases are pre-tempered or conditioned before being admitted into the calcining chamber, and thus the objectionable conditions just described as due to excessively high temperatures, are to a large extent avoided. Accordingly, since the smaller sizes of material will not be overheated, good results may be obtained without close sizing of the material.

This novel procedure of tempering the gases of combustion before admitting them to the calcining zone makes it possible to calcine limestone or other materials without employing high temperatures in the calcining zone, that is to say, the temperatures in the calcining zone need not be greatly in excess of the actual temperatures that are most desirable for calcining the particular material under consideration even though the combustion temperature of the fuel used is extremely high. In other words, there is no danger of excessively over-heating either the larger or the smaller pieces no matter how much time is consumed in their travel through the calcining zone. Consequently, the quality of the finished product, including both the larger pieces and the smaller pieces, is greatly enhanced.

The foregoing statement may be clarified when it is realized that the average flame temperature under good combustion conditions, using oil, gas or coal, is approximately 2500 degrees to 3000 degrees Fahr. whereas in calcining limestone so as to produce a high quality lime product, it is desirable to accomplish the calcining at approximately 2000 degrees Fahr.; in calcining gypsum to make "Keene" cement it is desirable to accomplish the calcining at approximately 1200 degrees Fahr., and in calcining gypsum to make "hardwall" plaster, it is desirable to accomplish the calcining at approximately 340 degrees Fahr. These figures show the importance of pre-tempering the calcining gases before they are allowed to come into contact with the material to be calcined.

Because the length of time that the material must remain in the calcining chamber is governed by the size of the largest pieces, whereas flame penetration and draft requirements are governed by the pieces of the smallest size, it will readily be seen that the very best results in calcining are obtained when the raw material is sized within fairly close limits. While the flames are being drawn vertically by the draft, flame penetration, transversely, is governed by the size of the interstices or voids between individual particles, while on the other hand, the size of the interstices is governed by the size of the smallest particles in a mixture of given materials.

As can be well understood from the above, the combination of the steps of tempering the gases of combustion to approximately the desired calcining temperature of the material being treated and of passing the stream of material through the calcining zone differentially, depending upon the differential rate of calcination within the calcining zone, results in the production of a uniformly high quality calcined product.

The apparatus of the invention, briefly, is advantageously embodied in the form of a so-called vertical unit. The material, such as limestone, is fed into a hopper at the top of the unit and gradually descends by gravity into and through the calcining chamber or zone, which is located directly underneath the hopper. The calcined product is discharged at the bottom of the calcining chamber, where its rate of discharge is carefully controlled in order to insure a substantially uniform product at every point.

In the preferred construction of the unit, the material, as it descends through the calcining chamber, encounters a series of horizontally disposed tunnel elements which are suitably spaced apart one from another, both vertically and horizontally, and which function as material-supporting baffles. Each tunnel element is open along the bottom thereof, and extends across the full width of the calcining chamber. The descending material closes around each tunnel element, and, by assuming its natural angle of repose thereunder, forms a rough floor, which, in conjunction with the tunnel element, provides a tunnel or conduit for the passage of the heated gases into and through the material, as previously mentioned.

During the operation of the unit, portions of the heated gases are caused to enter the interstices naturally existing in the rough floor of each tunnel, and thence, to continue their travel through the irregular and sinuous passages existing in the body of material, preferably by means of an induced draft.

Considering the performance of the unit, it is well to state experience has taught that, with a mixture wherein 4-inch sizes are the smallest, flame penetration with a given draft is approximately three feet; where 2-inch sizes are the smallest, flame penetration is approximately one foot; and where ¼-inch sizes are the smallest, flame penetration is only approximately four inchs. Therefore, in designing calcining kiln units in accordance with the invention, the transverse spacing between tunnel elements at certain calcining levels preferably varies according to the screen size of the particular material which is to be calcined in that unit.

Novel features of the invention relate to the mechanism and method outlined above.

In the drawings, which illustrate several specific embodiments of the invention, Fig. 1 represents a vertical section taken longitudinally through a calcining unit of a preferred type pursuant to the invention, which unit is especially adapted for the burning of limestone in the production of uniformly high quality lime, the section being taken on the line 1—1, Figs. 2 and 3;

Fig. 1A, a diagram of the major portion of Fig. 1 drawn to a reduced scale and showing, in the barest outline, the interior of the kiln divided into a series of approximate columnar spaces $a'$ to $f'$, between which the flow of material through the kiln may be considered as being divided;

Fig. 1B, approximately the portion enclosed by the broken line 1B in Fig. 1, but showing the chutes 115 and the sleeves 116 in nearside elevation instead of in section as in Fig. 1;

Fig. 1B1, approximately the same portion 1B, but showing the sleeves 116 in the raised position instead of in the lowered position as in Figs. 1 and 1B;

Fig. 1C, approximately the portion enclosed by the broken line 1C in Fig. 1 drawn to an enlarged scale;

Fig. 1D, a view similar to Fig. 1C, but showing a different displacement bar;

Fig. 2, a vertical section taken on the line 2—2, Fig. 1;

Fig. 3, a top plan of the calcining unit of Figs. 1 and 2, the storage bins and the raw material which is normally contained in the feed hopper, being omitted for convenience;

Fig. 4, a vertical section taken on the line 4—4, Fig. 2, drawn to an enlarged scale; this view illustrates the combustion and/or tempering chamber per se;

Fig. 5, a view in perspective, looking down, illustrating the more prominent parts of the variable discharge mechanism;

Fig. 5A, a diagram indicating some of the possible movements of a displacement bar;

Fig. 5B, a fragmentary detail, somewhat enlarged, illustrating another type of adjustable actuating means, or dog, operative directly upon the displacement bars;

Fig. 6, approximately the fragmentary portion enclosed by the broken line 6 in Fig. 2, drawn to an enlarged scale;

Figs. 7 through 7D, perspective views illustrating, respectively, various ways in which the profiles of the displacement bars of the variable discharge mechanism may be configurated;

Fig. 8, a chart which aids in the description of the principle of variable or differential discharge characteristic of the invention;

Fig. 9, a view similar to that of Fig. 2, but fragmentary in nature and illustrating various changes which are desirable to render the invention especially adapted for producing high grade $CO_2$ gas as a by-product of lime burning;

Fig. 10, an elevation corresponding to Fig. 9, looking in the direction of the arrow 10 in Fig. 9;

Fig. 11, a fragmentary section drawn to a reduced scale, and illustrating an embodiment of the invention which utilizes mechanical stoking of solid fuel, such as coal, instead of gas or oil as indicated in Fig. 2;

Fig. 12, a vertical section taken on the line 12—12 in Fig. 11;

Fig. 13, a fragmentary vertical section taken on the line 13—13 in Fig. 14, indicating changes which eliminate the combustion or tempering chamber, thereby rendering the kiln adaptable for mixed feed operation in order to produce highest quality $CO_2$ gas, with, however, a relatively poor lime product;

Fig. 14, a vertical section taken on the line 14—14 in Fig. 13;

Fig. 15, a fragmentary section taken through the lower part of a calcining chamber which follows somewhat the construction represented in Fig. 1, including, however, changes which are especially adapted for producing lime with a high available CaO content;

Fig. 16, a view in perspective of another apparatus for accomplishing the variable or differential discharge of the finished product from the kiln, the results being similar to those produced by the apparatus of Fig. 5;

Fig. 17, a fragmentary side elevation, partly in section, of the inventive embodiment of Fig. 16, drawn to an enlarged scale; and, Fig. 18, a view in perspective of a detail of Fig. 17.

The apparatus of the invention may be varied in design to satisfactorily meet many different calcining needs. The embodiments here specifically illustrated and described, relate particularly to the burning or calcining of limestone in the production of various grades of lime.

The present invention marks a radical departure from the conventional types of kilns, and involves a method of calcining that produces a uniformly high quality product. The apparatus is highly advantageous in comparison with conventional kilns.

The method involves the continuous charging of a calcining zone with material to be calcined, and the discharging of the calcined material differentially across the transverse sectional area of the calcining zone in accordance with the varying rates of calcination. This means that the rate of discharge of any fractional portion of the calcined material, considered across the transverse sectional area of the calcining zone, is governed by the time rate of calcination of that fractional portion, regardless of the time rate of calcination of any other portion, with the result that a very uniformly calcined product is obtained.

Referring now to Figs. 1 through 7, in which is illustrated preferred apparatus, pursuant to the invention, for general application in the lime-burning industry, the reference numeral 110 denotes a calcining chamber or zone at least partially defined by the refractory side walls 111 and 112 and by the refractory end walls 113 and 114, Figs. 1, 2 and 3. Figs. 1 and 2 include a partial showing at 151 of material in the process of calcining.

A feed hopper 150, advantageously formed of sheet metal, is secured at the top of the several walls of the calcining chamber 110. This hopper leads directly into the upper part of the calcining chamber through a plurality of feed chutes 115.

Each feed chute is preferably arranged so that it may be elongated vertically, this being accomplished for example, by means of extensible sleeves 116, which telescope along the respective feed chutes 115. The feed sleeves 116 may be raised or lowered collectively, in this instance by means of the shafts 117 upon which are mounted pinions 118, the latter being in mesh with racks 119 secured on the several sleeves 116. The shafts 117, in this instance, are rotated by means of handwheels 120. In this manner, the capacity of the calcining chamber 110 is either increased or decreased according to whether the feed chutes are raised or lowered.

The bottom of the calcining chamber 110 is formed by a variable discharge mechanism that will be described fully hereinafter.

The calcination is accomplished within the calcining chamber 110, by means of gases that are conditioned to the proper temperature in the combustion or tempering chamber 121, Figs. 2 and 4. The combustion or tempering chamber is advantageously disposed laterally of the calcining chamber and preferably extends substantially coextensive therewith in its longitudinal dimension. As here illustrated, the combustion or tempering chamber is disposed at only one side of the calcining chamber. It is obvious, however, that in certain instances, it might be duplicated at the opposite side.

The tempered gases are drawn, preferably by an induced draft, into direct contact with the material in the calcining chamber through ports 122, 123 and 124, which extend through wall 112 and interconnect the two chambers. These ports are preferably arranged in tiers and are in registry with corresponding blind tunnels or passages 222, 223 and 224, respectively, that extend completely across the calcining chamber and terminate in the respective observation ports 122a, 123a and 124a, the latter being normally closed by transparent elements 81, made, for example, of heat-resisting glass so that the progress of calcining operations can be observed.

In their extension across the calcining chamber, the tunnels or passages are at least partially defined by respective tunnel elements 125, and at least partially by the intersticed floor surfaces 225 formed by the material to be calcined in assuming its natural angle of repose under the tunnel elements, as indicated in Fig. 1. The tempered gases of combustion flowing through the tunnels filter into and through the material to be calcined by way of the intersticed floor-defining surfaces 225, Fig. 1.

In this instance, the combustion chamber 121 is defined by a longitudinal refractory wall 126 and walls 113a and 114a, and by a refractory top 127 and bottom 128. It is advantageously fired by oil burners 129, which extend through the end walls 113a and 114a.

The several refractory walls defining the calcining chamber 110 and the combustion chamber 121 are preferably mounted on a structural steel frame 30 which in turn is supported on columns 30a.

Depending from the frame 30 and disposed directly below the calcining chamber 110 is a series of spouts 31, each of which discharges finished product squarely onto a corresponding stop plate 64 of the variable discharge mechanism, the rate of discharge through each individual spout being variably or differentially regulated in accordance with the method of the invention, as explained in detail hereinafter.

*Internal construction of the combustion-tempering chamber*

While the performance of the two functions, namely combustion and tempering of the gases resulting from combustion, is the purpose of this chamber, it may, for the sake of brevity, be referred to as simply the "combustion chamber," it being understood that the tempering or conditioning feature is implied in this term.

In accomplishing the purpose of the invention, refractory baffles are so placed internally of the combustion chamber 121 as to provide, as a part of the combustion chamber, a lower or firing chamber 35 (see especially Fig. 4) in which either return gases or atmospheric air or both, are mixed with the primary gases of combustion for tempering the same, that is to say, for so reducing the high temperatures of combustion that the resulting mixed gases have substantially the temperature suitable for a particular purpose, for example, calcination. The placement of these baffles, in general, is also such as to distribute the tempered gases substantially uniformly to the several sets of gas-conducting tunnels 222, 223 and 224. Included is a pair of elongated horizontal baffles 36 extending toward each other from the opposite end walls 113a and 114a. The baffles 36 define, at least partially, the lower or firing chamber 35, and provide, between their opposed ends, a horizontal opening 38 centrally of the length of the combustion chamber for the flow of gases upwardly into the combustion chamber proper. A pair of small baffles 37 is spaced apart from the opposed ends of the baffles 36, and serve to divide the said horizontal opening into the elongated central opening 38 and a pair of smaller flanking openings 39, which insure a supply of hot gases adjacent the opposite ends of the combustion chamber.

The set of ports 122 leading into the gas-conducting tunnels 222 and comprising the lower tier, is disposed directly above the baffles 36 and 37. Above the ports 122 is located a series of variously shaped and variously spaced baffles 40, 41 and 42. The baffles of this series are preferably spaced relatively closely at the center of the chamber, but relatively widely at the ends, primarily for the purpose of properly guiding the flow of gases into the various ports 123 comprising the intermediate tier. It will be remembered that ports 123 form the entrances to the corresponding tunnels 223. Above the ports 123, and preferably without intervening baffles, is the set of ports 124 leading into the gas-conducting tunnels 224 of the upper tier.

It has been found desirable to make the ports 123 of the intermediate tier considerably larger than the ports 124 of the upper tier, and those of the lower tier somewhat larger than those of the upper tier, for properly regulating the flow of the gases of combustion into the calcining chamber 110. All of these ports are preferably spaced apart approximately uniformly in each tier, but in staggered relationship to the ports in an adjacent tier.

Pyrometer elements 43 of a suitable type may extend into the combustion chamber, for example, through the top 127, and be connected with recording pyrometers 43a for the rigid control of temperatures within the combustion chamber.

Properly located ports 92 Fig. 4, normally covered with transparent closures 93, may be provided in the end walls 113a and 114a for observation purposes.

*Circulation of gases*

The tempered gases are drawn through the ports 122, 123 and 124, see Fig. 2, through tunnels 222, 223 and 224, and through the intersticed material to be calcined, by means of induced draft, exerted, for example, by an exhaust fan of conventional design, such as that indicated at 45. The fan is advantageously located in return piping 46, which leads from a plenum space or chamber 90 that is in direct communication with the top of calcining chamber 110, to a return header 47. This return header leads into the firing chamber 35 through conduits 48, which are mutually spaced apart along the length of the return header and the combustion chamber. An exhaust flue 49 leads from the return piping 46, and serves to carry off more or less of the gases, as determined by the setting of dampers 50 and 51, see Fig. 3, into the atmosphere, or for disposal elsewhere. A pyrometer 52 indicates the temperature of the gases as they leave the calcining chamber and a draft gauge 53 indicates the extent of the draft. As is hereinafter made clear, the proper regulation of the draft by means of the dampers is very important in controlling the circulation as desired. If desired, a stack (not shown) providing a natural draft of suitable force can be used instead of the exhaust fan.

*Passage of material*

The material to be calcined, indicated at 55, may be charged into the feed hopper 150 from storage bin 56. The hopper 150 is preferably rectangular in formation, and has considerable height for the purpose of maintaining a sufficient column of the raw material 55 to seal the calcining chamber against an undue inflow of air, for which purpose the hopper is kept filled with the raw material at all times. Should there be however, any small leakage of air with the feed of material, it will be uniform in quantity during the course of operation of the kiln, and may ordinarily be ignored. Keeping the small leakage of air uniform is important for the maintenance of substantially constant draft, and, therefore, of substantially constant calcining conditions.

In its progress downward through feed chutes 115 and adjustable sleeves 116, the raw material 55 enters the calcining chamber 110, and by means of the uppermost tier of tunnel elements 125, is split up into approximately the transitory columns $a'$ to $f'$ in Fig. 1A, closing around the tunnel elements in the successive tiers, thereby forming the tunnels 222, 223 and 224 already mentioned. This exposes the descending material to thorough permeation by the tempered gases drawn in from the combustion chamber 121. Thus, the calcining of the material proceeds until the lower portion of the chamber 110 is reached. Here, atmospheric air, which is drawn in through the discharge spouts 31, serves to cool the fully calcined material immediately prior to its discharge.

Refractory partitions 58 rest on the supporting framework 30 between adjacent discharge spouts 31, and define, at least partially, chutes 94 leading directly into the discharge spouts. From the latter, the finished product is deposited on the stationary stop plates 64, where it is arrested until removed by operation of the variable discharge mechanism.

Reverting to the adjustable sleeves 116, their purpose is to vary the depth in the uppermost portion of the calcining chamber. It is through the interstices of this material that the gases must be drawn just before leaving the calcining chamber. Since coarse material has larger interstices than fine material, and offers less resistance to the passage of the gases, there must be a greater depth of coarse material than of fine material to offer the same resistance. A minimum depth is indicated at 95 in Fig. 1B and a maximum depth at 96 in Fig. 1B1.

*Differential or variable discharge mechanism*

This mechanism may be embodied in various forms, the preferred one comprising a reciprocable frame 60, Figs. 1, 2, 5 and 6, consisting of slotted longitudinal members 60a and end members 60b and 60c, mounted for example, on rollers 61 held rotatively in brackets 62 attached to a stationary framework. The stationary framework advantageously includes slotted longitudinal members 67 and stringers 63, Figs. 1, 2 and 6, all rigidly connected to columns 30b. The stop or arresting plates 64 extend transversely of the reciprocatory frame 60 to suit the spacing of the spouts 31, and are supported by the stringers 63. The lower portions of the stationary longitudinal members 67 form stationary supports, as will be apparent hereinafter.

The finished product in the spouts 31 rests on the plates 64 ready to be removed therefrom in relatively small individual quantities, which are varied, when necessary, in accordance with the progress of the calcining process taking place in the columns above the respective plates.

The finished product is advantageously removed by means of displacement bars 65 extending lengthwise of the plates 64 and disposed intermediate the side edges thereof. The bottom face of each displacement bar clears the surface of the stop plate with which it is associated, and the bar is subject to reciprocatory motion laterally of the plate.

In accordance with the method of the invention, it is desired that the unit reciprocatory strokes of the bars be subject to differentiation in agreement with the variation in product-removal requirements. For this purpose, the opposite end portions of each displacement bar, which extend first through the slots in the stationary members 67 and then through the slotted members 60a of the reciprocatory frame 60, Figs. 2, 5 and 6, finally extend through and beyond openings 68a defined by jaws 68b of control dogs 68. The openings 68a are approximately V-shaped, but inverted, and the dogs 68 are secured to the frame 60, preferably adjustably, by means of bolts or screws 70 extending through slots 69 in the jaws 68b.

It should be noted that the displacement bars 65 rest upon and are supported by the lower slideway portions of the longitudinal stationary frame members 67, but desirably do not contact the longitudinal reciprocatory frame members 60a in any way. Thus, the displacement bars are not influenced by the movement of frame 60 except when they are contacted by the dogs 68.

Reciprocation of the frame 60 on its supporting rollers 61 actuates all or part of the displacement bars, similarly or differentially, depending upon the settings of the respective dogs. The opening 68a in each dog is just wide enough at its apex to accommodate an end of a displacement bar 65, but diverges so as to afford an increasing amount of play for the end of the displacement bar accordingly as the dog is positioned upwardly therefrom. In reciprocating the frame 60, the respective displacement bars 65 push more or less of the finished product from the plates 64, thus causing a gradual descent of the material in process, through the calcining chamber 110.

The method according to which the displacement bars operate, can best be explained by referring to Figs. 1, 1A, 1C, 1D, 2, 5 and 5A.

The representation in Fig. 1C is typical of all the spouts 31 and stop plates 64. Here, the displacement bar 65 is shown completely buried in the product 151a at the bottom of the superimposed column e'. Supposing the bar 65 to have been moved towards the right from an initial position such as the dotted one at 65a to the full-line position at the right, it will then have pushed off the plate a certain quantity of the product 151a, of which a portion 151b is shown in the act of falling. Finally, the product assumes its angle of repose, as indicated at 152, while the bar starts towards the left on its return stroke to the initial position and displaces the material in front of it, breaking through the angle of repose at 152a, and repeating, at the left, the discharge of the product similarly to that at 151b. The back and forth travel of the bar 65 continues indefinitely, piling up the product, as at 71, on a floor 72. If desired, the product may fall onto, for example, a belt conveyor (not shown).

The differential discharge of material from the calcining chamber can now be explained in its entirety. In Fig. 5, for example, the dogs 68 are individually adjusted in harmony with any differential kiln discharge desired. If a dog is lowered until the apex of the opening 68 rests on a bar 65, then the full reciprocative strokes of the frame 60 are exerted upon the bar. If, on the contrary, the dog is raised until the lower faces of the jaws are even with the bar, then no part of the stroke is exerted upon the bar. Therefore, any dog can be adjusted to exert at either end thereof, any fractional part of the stroke between zero and maximum.

Examples of differential movements of a bar 65 on a plate 64 are shown in Fig. 5A where the full lines 65 show the middle position of the bar relative to the plate, and the dotted lines 65b and 65c, alternate positions of the bar. In the instance of 65b, the bar has no motion at the left end, but the maximum stroke at the right end. In the instance of 65c, the bar has a small movement at the right, and only a part of the full stroke at the left.

The adjustable control dogs 68 represent merely one convenient form of control device which may be associated with the reciprocatory frame 60 for differentially controlling the movements of the respective displacement bars 65. Other devices for varying the relative strokes of the respective displacement bars and of the respective opposite ends of a single displacement bar may be employed. For instance, as illustrated in Fig. 5B, pairs of adjustable limit-stop elements 97 may be threaded through spaced partitions 98 of relatively widely slotted reciprocatory longitudinal frame members 60a', so that the ends of the displacement bars 65 are disposed therebetween. Screwing of the limit-stop elements 97 of each pair varies the effective spacing therebetween, making it either greater or less, or offsetting it in one or the other direction—considered longitudinally of a frame member 60a'—from the lengthwise center of the stop plate 64 with which it is associated.

Thus, it is seen that a principle involved in the above type of variable discharge mechanism is the provision for limiting the stroke of an end of a displacement bar, as desired, within a range afforded by a predetermined maximum stroke.

It is to be noted that the thickness of the displacement bars should be a little less than the width of the slots 73 in the reciprocatory frame members 60a and the slots in the stationary frame members 67, so they can be easily withdrawn or replaced while the frame 60 is in motion.

For reciprocating the frame 60, a connecting rod 78, which extends to a crankshaft 75, is provided. Obviously, the reciprocations are very slow so that a considerable speed reduction is required between crankshaft 75 and an electric motor 76 by which it is driven. Also, it is desirable to have means for changing the speed of the crankshaft between certain limits. To accomplish this twofold purpose, a variable speed mechanism 73, Fig. 3, of standard manufacture, such as a "Reeves," may be directly connected with the motor, the "Reeves" being in turn, belted to a compound worm-gear speed reducer 74, which delivers power by belt to the crankshaft 75.

In Figs. 16, 17 and 18 is shown another embodiment of variable or differential discharge mechanism pursuant to the invention, in which hollow drums 100, made, for example, of sheet metal, and rotatably mounted in aligned groups or sets on shafts 101, are placed directly underneath the discharge spouts 31 so as to leave a limited space 102 between the spout and the upper circumferential area of the drums 100. Dividing plates 32 may be secured to the spouts, extending along the lengths of their discharge openings, preferably centrally thereof, and depending to just short of touching the material-receiving surfaces of drums 100. The lower portions of the drums are cut out in the form of sectors 104, providing inverted V-shaped jaws, and projecting into the sector spaces or jaws are standards 105 which are adjustably mounted on cross-bars 106 of a reciprocable frame 107 mounted on rollers 108, this frame being connected by means of a rod 109 to a drive mechanism similar to the one indicated at 73 to 78 in Fig. 5, but not shown in Fig. 16.

In operation, supposing the frame 107 to be reciprocated, the standards 105 are adjusted to various heights, as indicated, for example, in Fig. 17, so that the same reciprocative stroke of the frame will rotate the drums 100 through varying fractional parts of a single rotation, thereby causing the withdrawal from the discharge spouts 31 of correspondingly varying amounts of material. The adjustment of the standards 105 is effected by means of bolts 132 which extend through slots 134, Fig. 18, to secure the standards in notches cut in the respective crossbars 106.

In Fig. 16, four drums are shown on each shaft 101, each drum being rotatable independently and having its individual standard set at such a height as to cause the corresponding drum to discharge a certain differential quantity of material in accordance with the particular setting of the standard.

Assuming that the stroke of the frame 107, Fig. 17, is, at the moment, towards the right, then the drum 100a is being rotated counterclockwise, at the moment, meanwhile discharging material at 130, because the top of its standard 105 is in contact with the sector face 131, and will so continue until, at the end of the stroke, the standard is in the dotted position 105a. At that time, the sector face 136 will have moved to the position 136a. On the return stroke, the standard idles until it contacts the sector face at 136a and commences moving the drum clockwise, thereby stopping the flow of material at 130, gradually, and starting the flow on the opposite side of the drum. This rocking back and forth of the drum with its discharge of material first on one side and then on the other, continues indefinitely. During the same time that the drum 100a is rocked as just described, the adjacent drum 100b stands still until its standard 105, in its movement towards the right, contacts the sector face 138, after which, in moving to the dotted position 105c, the standard will have moved the drum 100b counterclockwise to the point where the sector faces 138 and 139 will have assumed the dotted positions 138a and 139a, respectively. This limited counterclockwise movement of the drum 100b will have discharged material (not indicated) at the left of the drum, but much less in quantity than that discharged by the first drum at 130. Thus it is obvious that as any standard 105 is lowered, its corresponding drum, through the increased idleness, discharges less and less material, thereby making it possible, as in the case of the apparatus of Fig. 5, to closely regulate the performance of a kiln by means of a differential discharge of its finished product.

Going back to the apparatus of Fig. 5, an especially high degree of control can be exercised over the differential discharge of material, by utilizing displacement bars that have variously configurated longitudinal profiles, a very few of which are exemplified in Figs. 7 to 7D. In Fig. 7, the bar 140 effects a minimum discharge at the center, which gradually increases to a maximum at both ends. In Fig. 7A, exactly the reverse would be true of the bar 141. In Fig. 7B, the bar 142 effects a maximum discharge at one end thereof, which is gradually reduced to a minimum discharge at the other end. In Fig. 7C, the bar 143 is divided into a plurality of forms which produce maximum discharge at the high points 143a and minimum at the low points 143b. In Fig. 7d, the bar 144 is divided into three wedge-shaped sections 144a, 144b and 144c of varying lengths. Here the discharge at successive points along the bar is differentiated quite closely in proportion to the height of any particular point above the base of the bar. Obviously, the variation in the shaping of the profile of a bar is infinite, and is limited only by practical considerations of simplicity and economy.

It is to be noted that the slots in the longitudinal members 60a of the movable frame 60, as well as the slots in the longitudinal members 67 of the stationary framework in Figs. 1, 2 and 6, must be of suitable sizes to accommodate the variously shaped portions of the bars 140 to 144.

*Operation of the novel differential discharge*

If the cross-section of a body of material passing through a kiln is divided into small areas and if in all these small areas even an approximate uniformity of burning or calcining can be maintained, then it follows that the summation of all the small areas, that is to say, the entire area of the aforesaid cross-section, must show substantial uniformity of calcination of the material throughout such entire area.

The chart of Fig. 8 serves as clarification. There, the outline ABCD represents the transverse or horizontal area of the calcining chamber or zone, which, for convenience and for example, may be divided into an arbitrary number of sub-areas, such as a, b, c, d, e, and f. Each of these sub-areas may again be divided into fractional parts a1, a2 and so on, down to f4, inclusive. Each of the fractional sub-areas represents, graphically, a space in which a controlled average differential calcination may take place, pursuant to the method of the invention. The exact nature of the differential discharge is determined from time to time in accordance with the varying characteristics of the kiln conditions as well as the varying characteristics of any material being operated upon.

The utility of the differential or variable discharge mechanism can be understood by referring to Figs. 1, 1A and 2, wherein the displacement bars 65 are all of uniform rectangular profile. Here the kiln is fired from a combustion chamber 121 on one side only. Consequently, the kiln wall 112 on that side is quite hot, whereas the opposite kiln wall 111 is cooler, as is obvious from Fig. 2. The end walls 113 and 114 in Fig. 1 have radiating surfaces, so the material adjacent these end walls tends, under ordinary circumstances, to remain cooler than the material in the center portion of the kiln. Also, the two columns a' and f', Fig. 1A, immediately adjacent the end walls, are only half the width of the columns b' to e' in the central portion, for which reason the end columns a' and f' have a maximum discharge capacity of one-half the maximum capacity of each central column.

In order to maintain uniform calcination in view of the conditions just described, the discharge mechanism for the different columns a' to f' are normally set as follows: all adjusting elements or dogs 68, Fig. 5, on the side opposite the combustion chamber are raised in order to slow down, progressively across the kiln from the hot wall on the combustion side to the cooler wall on the opposite side, the downward flow of material through the kiln. The actual slowing down is made sufficient to balance the flow of material in accordance with the heat available progressively across the kiln. As an additional adjustment, the pair of dogs 68 adjacent each end of the kiln, are raised to further slow down the flow of material in each of the corresponding end-wall columns $a'$ and $f'$. This additional slowing down is made sufficient to not only compensate for the heat radiated through the end walls, but also to allow for the fact that the end wall columns are each only half as wide, that is to say, at $a'$ and $f'$, as each of the central columns $b'$, $c'$, $d'$ and $e'$.

In actual practice, where the finished product resulting from the differential discharge, is allowed to pile up underneath a kiln, the contour of the pile from end to end and from side to side gives a clue or index as to the performance of the kiln. An example is the pile 71 in Figs. 1 and 2, which is shown in the process of building up in accordance with the performance described immediately preceding this paragraph. In Fig. 1, the peak 711 is the combined result of one-half the discharge from column $b'$ plus one-half the discharge from column $c'$; the peak 712, one-half column $c'$ plus one-half column $d'$; the peak 713, one-half column $d'$ plus one-half column $e'$; the peak 714, one-half column $b'$ plus one-half column $a'$; peak 715, one-half column $e'$ plus one-half column $f'$; peak 716, simply one-half column $a'$; and peak 717, simply one-half column $f'$.

Taking the quantity of finished product discharged from each of the columns $b'$ to $e'$ as a unit measure, then the peaks 711, 712 and 713 represent unit quantities; peaks 714 and 715, three-quarters unit quantities; and, peaks 716 and 717, one-quarter unit quantities. As the pile 71 continues to build up, the peaks are gradually rounded out so the pile assumes a contour somewhat resembling the curved line 710.

In Fig. 2, each of the peaks 711, 712 and 713 shows as a corresponding ridge which slopes from the high point on the combustion chamber side, back towards the wall 111; likewise, the peaks 714 and 716 show as respective corresponding sloping ridges, all the said ridges in this figure bearing reference numerals similar to those used for the peaks in Fig. 1.

In graphically portraying the method of the invention, the chart of Fig. 8 gives an idea of how closely the discharge of calcined material can be regulated by the displacement means and associated control mechanism of the novel apparatus. The areas of the rectangles designated $a$, $b$, $c$, $d$, $e$ and $f$, each comprising four sub-areas, represent those fractional parts of the total calcining zone controlled by the respective displacement means, such as the bars 65, or the sets of drums 100. The discharge within the area represented by any one of the rectangles is controlled wholly independently of the control of the area represented by any of the other rectangles. In the case of a displacement bar 65, the dog at one end of the bar may be set higher than the dog at the opposite end, with the result that the sidewise oscillations of the bar will have a lesser amplitude at the said one end portion thereof than at the said opposite end, the amplitude gradually increasing along the length of the bar from the said one end to the said opposite end. Accordingly, there is a differential discharge, fractionally, end-to-end of each one of the rectangular areas $a$, $b$, $c$, $d$, $e$ and $f$. This differential discharge is arbitrarily represented by the fractional sub-area 1, 2, 3 and 4 of each rectangle. By varying the profile of a displacement bar 65 along its length, it is possible to obtain substantially any desired rate of discharge within the sub-areas 1, 2, 3 and 4 of any rectangle. In the case of a set of drums 100, the several standards 105 may be individually positioned to govern the discharge differentially, in accordance with the sub-areas 1, 2, 3 and 4 of any rectangle.

In deciding just how the discharge is to be differentially regulated during the course of any given operation, samples of the discharged material may be taken from time to time throughout the area of discharge, and the variable discharge mechanism adjusted to rectify any tendency toward over-burning or under-burning wherever the same may occur throughout the stream of material.

Operation of the kiln as a whole

It should be realized that during any given run of the kiln, which in most cases will be from many months to a year's duration, adjustments of the feed chutes 116, the dampers 50 and 51, and the variable discharge mechanism are to a great extent inter-related for producing a high-quality product.

In practice, the gradation in screen size of raw material will vary from month to month and often from day to day. The kiln conditions must be varied accordingly.

Since this variation in the gradation of screen size of the raw material results in corresponding variations in resistance to gas flow through the material within the calcining chamber, the feed chutes 116 are either raised or lowered to the proper extent for accommodating the new conditions and maintaining the resistance to gas flow constant so far as the actual calcining zone is concerned, while the dampers 50 and 51 are adjusted to compensate in draft conditions for the variations in resistance offered to inflow of cooling atmospheric air by the discharging calcined material within the discharge spouts, and thus, to maintain calcining conditions and cooling temperatures substantially constant. Any slight variations in calcining conditions that might occur within the kiln due to these readjustments are easily taken care of by suitable adjustments of the variable discharge mechanism.

When the raw material is charged into the feed hopper, and when it flows into the calcining chamber, there is a certain amount of segregation of the fine and of the coarse particles. Accordingly, when there is a change in gradation in screen size of the raw material, as explained above, the variable discharge mechanism should be adjusted to compensate for the variations in the conditions of segregation, so uniform calcination will be maintained.

During any given run of the kiln it is often necessary or desirable to make a change in the tonnage output per unit time, as for instance, to meet variations in market demand for the product. When making such a change in tonnage output, all of the inter-related adjustments must be made, as explained above, for insuring uniformity of calcination.

As can now be fully realized, this possibility of inter-related adjustment, i. e. the regulating of the various factors affecting the quality of the final product, each for the purpose of balancing the others to the extent called for, makes possible the producing of a far superior product under all circumstances of operation.

It should be noted that while the gases of combustion may be tempered entirely within the combustion-tempering chamber 121 by means of recirculated gases, or by cool atmospheric air, or by a combination of both, before they pass into the calcining chamber 110, they may also be affected, so far as their heating characteristics are concerned, by mixture, within the calcining chamber, with relatively hot gases resulting from the drawing of cool atmospheric air in through the discharge spouts 31, such being the case in the embodiment hereinbefore described. In most instances this is desirable, since this last named cool atmospheric air serves to cool the discharge product to temperature at which it may be easily handled, and the heat thereby extracted is saved. The dampers 50 and 51 provide for closely regulating the relative quantities of gases drawn in from the combustion-tempering chamber and of cooling air drawn in through the discharge spouts, thus enabling the calcining operation and the cooling of discharging product to be controlled as desired.

Apparatus arranged for producing and recovering high quality $CO_2$ gas

Reference is now made to Figs. 9 and 10 which illustrate apparatus similar in many respects to that already described herein, but now arranged especially for producing and recovering high quality $CO_2$ gas. The same reference characters as used in the prior figures designate identical parts.

In this form of apparatus, cold air used for cooling the calcined material just prior to discharge thereof, is kept entirely separate from the hot calcining gases. These calcining gases when exhausted from the kiln, comprise for the most part high quality $CO_2$, and they pass through the return-piping system, a portion being continuously drawn off for utilization as a byproduct of the calcination while the remaining portion is recirculated. The gas-conducting passages 222 of the next to lowest tier of such passages are blocked off from the combustion chamber 121 by means of a refractory filling material 80. The transparent elements 91 normally sealing the observation ports 122a in Fig. 2, are removed, and conduits 81 installed instead. These conduits are left open to the atmosphere, and serve as inflow openings for cooling-air.

The transparent elements covering the observation ports opposite the lowest row of tunnel elements 125, are also removed and replaced by conduits 82, which lead into a common exhaust header 83. An exhaust fan 84 creates suction in this exhaust header and discharges through the waste exhaust stack 85.

Connected with the exhaust header 83 by piping 86 is an upper exhaust header 87, from which respective exhaust conduits 88 communicate with the lower part of the feed hopper 150, preferably immediately above the feed chutes 115. A regulating damper 89 may be provided in the piping 86.

By means of the above-described exhaust system, served by the exhaust fan 84, cold atmospheric air is sucked into the apparatus through the discharge chutes 31 and through the conduits 81, and is eliminated through the exhaust stack 85 via the exhaust conduits 82. At the same time, any possible inflow of atmospheric air through the feed hopper 150, which might at times accompany the feed of raw material, is by-passed around the calcining chamber by means of the exhaust conduits 88, the upper exhaust header 87, and the exhaust piping 86. The high quality $CO_2$ gases are removed from the apparatus, as a byproduct of the calcination, through the regular exhaust stack 49.

This form of apparatus is especially useful in sugar refining operations where a high quality $CO_2$ gas is desired along with a lime product.

Apparatus for producing the very highest quality $CO_2$ gas, but a relatively poor grade of lime, is illustrated in Figs. 13 and 14. Here, the combustion-tempering chamber is eliminated, or at least plugged off, and the firing is accomplished directly within the calcination chamber 160. The raw limestone is intimately and uniformly mixed with about 10% by weight of an approximately equivalently sized oil-carbon coke or coal coke as fuel, this being advantageously accomplished by placing the limestone in the hopper 161 in thin layers, alternating with thin layers of coke, see Fig. 14. The charge is fed into the calcining chamber through a plurality of vertically adjustable feed chutes, indicated generally 162, which are similar to the feed chutes 115 of the prior embodiments, and is thoroughly mixed, by reason of this feeding process, before reaching the calcining chamber.

The calcining chamber 160 is similar to that of the prior embodiments, but its two longitudinal side walls 158 and 159 may be substantially identical in formation, except for the provision of observation ports 163 and dampered air-inlet conduits 163—1 in the wall 159. Tunnel elements 164 are provided in a manner similar to the prior embodiments for maintaining the descending material in a loose and freely flowing condition, the two lower tiers thereof providing, in part, tunnels in continuation of the air-inlet conduits 163—1. The discharge mechanism (not shown) is identical with that illustrated in the prior figures and explained in detail hereinbefore.

The coke is ignited within the calcining chamber, and for enabling this to be accomplished conveniently, conduits 165 may extend from the exterior of the calcining chamber to the interior thereof, preferably in alignment with the tunnel-forming undersides of the uppermost tier of tunnel elements 164. Thus, igniting flames may be shot into the interior of a calcining chamber from a portable gas or oil burner or other similar igniting agency, until the coke is sufficiently heated to support combustion, without exterior aid. Hinged covers 166 may be provided at the exterior ends of the conduits 165, to be raised during the igniting operation, but thereafter closed to prevent atmospheric air from being drawn in through the igniting conduits during the calcining operation.

The calcining operation is preferably confined to that section of the calcining chamber which comprehends the two uppermost tiers of tunnel elements 164. A suitable draft is maintained, as in the prior embodiments, by means of an exhaust fan or stack (not shown) connected to exhaust flue 167. Here, after the igniting operation is completed, cool atmospheric air is drawn in from the air-inlet conduits 163—1 by way of the two lower tiers of tunnel elements 164, passing upwardly into the calcining zone and cooling the lower calcined material as it passes. The cool air is drawn in in just such quantities as required for combustion of the coke. In cooling the calcined material which it first contacts, the cool air is preheated before reaching the coke, and thus more readily promotes combustion. Substantially all of the air is combined with the carbon in the coke by reason of the combustion, and produces $CO_2$ gas. There is substantially no uncombined air to dilute the $CO_2$ gas. Whatever proportion of the high $CO_2$ exhaust gases is desired as a by-product of the calcining operation may be diverted from the exhaust flue 167 for storage or use as desired.

The feed hopper 161 is preferably rectangular in configuration and of extended height. It is illustrated as being considerably higher than the hopper of prior embodiments, but, as such, exemplifies what might be employed in all suitable instances to provide a more effective seal against inflow of atmospheric air through the hopper.

In order to prevent the bridging of material in the feed hopper, supporting baffles, preferably made of structural steel angles, are advantageously provided as shown in Figs. 13 and 14. The purpose of the supporting baffles is to define throats through which the raw material is passed, these throats being of sufficient width relative to the set height of raw material thereabove, so that the material will not be allowed to assume bridging formations. It has been found in practice that material of any particular size has a well established limit as to the opening over which it will not bridge, provided that the height of the material above the opening is such that it will not otherwise cause the material to bridge. As an example, material of a size known as one-inch mesh, would probably lock in a bridging action in going through a 6-inch vertical conduit if the depth of the material would be from 2 to 3 feet. On the other hand, this same material would not bridge across the 6-inch conduit if the material would have a height of only 2 inches. On this basis the baffles are so arranged in the feed hopper that, starting from the bottom and proceeding upwardly, the horizontal spacing of the baffles increase progressively until the top tier is reached, where the baffles are spaced apart horizontally far enough so that the throat between them is of sufficient width to prevent bridging, even when subjected to the weight of material above, all the way up to the top of the hopper.

In Figs. 13 and 14 there are five tiers, the baffles in these successive tiers commencing at the bottom, being designated by the numerals 168 to 172, respectively. Thus, it will be observed that the throats 168a in Fig. 14, are relatively small, so that any considerable height of material massed above them would cause a bridging action. The throats 169a to 172a are each progressively increased in widths over the widths of the throats of the next lower tier of baffles, until the widths of the throats of the topmost tier are such that bridging between the baffles thereof and the top of the hopper is reasonably sure not to occur.

It is to be noted that preferably the same number of baffles is used in each tier, but that the widths of the individual baffles in the respective tiers becomes less in ascending order so that the baffles of the greatest width are those at 168 and those of least width at 172. If desired, baffles of the same width might be used throughout, but in that case, the number of baffles in each successive tier, considered in ascending order, would be successively reduced.

It will also be noted that the effective height of material over each throat is very small, being, for each instance, only the distance from the particular throat concerned, up to the free surface of material which is formed under the first baffle above that throat.

This same arrangement of supporting baffles and thereby defined throats might be used in the hoppers of the prior embodiments if desired, since they are of universal application wherever a mass of what might be called "granular" material is gradually fed from the bottom of any hopper, bin, or the like by gravity flow.

Since in this embodiment of the invention, high quality $CO_2$ gas is desired as a by-product of lime production, provision is preferably made for the elimination of any air that might seep in with the material feed, much as in the case of the embodiment of Figs. 9 and 10. Here, a set of conduits 175 may be provided through one of the longitudinal walls of the feed hopper 160 immediately below the supporting baffles 168 of the lowest tier of such supporting baffles, and suitable conventional exhaust structure, including a header 176, exhaust piping 177, and a stack fan (not shown) provided for drawing out any air seepage before it has a chance to reach the calcining zone.

By balancing conditions of draft, air inlet opening size, and the rate of discharge, a calcining zone is maintained at the desired level in the calciner.

One method of placing layers of raw limestone and coke in the feed hopper is by utilizing a small shuttle conveyor which first runs under a rock bin and is covered with a uniform layer of rock. In returning, the conveyor backs directly over the open top of the feed hopper, and, in passing its belt moves forward at exactly the same rate the conveyor frame moves back. In this way, the material-supporting surface of the belt is stationary with respect to the feed hopper, and the conveyor actually rolls out from under the layer of stone, transferring the same to the feed hopper without disrupting its uniformity, it being noted that the shuttle conveyor is approximately the same size and dimensions as the horizontal cross section of the feed hopper. The shuttle conveyor continues to back until it passes under a coke bin and is covered with a layer of coke of the proper proportionate thickness, which layer is then transferred to the feed hopper, in the manner aforedescribed, as the conveyor moves forward on the next stroke, it being understood that this time the belt moves backward instead of forward. This process is repeated until the feed hopper is completely charged with alternate uniform layers of coke and stone. The hopper is maintained filled to approximately a constant level by frequent placement of additional layers.

*Apparatus for producing lime with high available CaO content*

By merely adding a water-cooling system to the apparatus of Figs. 9 and 10, and regulating the exhaust fan 84 thereof so that the temperature of the cooling air drawn out through the exhaust header 83 is never below approximately 1080 degrees Fahr., a lime product is obtained which has a high available CaO content.

Below approximately 1080 degrees Fahr., the lime combines with free moisture in the cooling air to form calcium hydroxide. When the humidity of the atmosphere is high, the formation of calcium hydroxide is sufficient to noticeably reduce the quantity of calcium oxide in the final lime product.

The water-cooling system cools the discharged product to the desired handling temperature. As illustrated in Fig. 15, it need merely comprise several loops of water-conducting tubes 180 which extend from a water-distributing header and a water-return header (not shown) entirely across the width of the calcining chamber below the lowest tier of tunnel elements. The distributing and return headers are preferably located just below the exhaust header 83. A suitable source of water supply is connected to the distributing header and sufficient circulation maintained to effect the desired degree of cooling of the discharging product.

It should be noted that the vertical distance between the two lowermost tiers of tunnel elements is considerably less than the vertical distance between the lowermost tier of tunnel elements and the bottom discharge openings, and that the draft induced by the main exhaust fan 45 is maintained sufficiently low that substantially no air is drawn into the calcining zone through the discharge spouts. All of the air utilized for cooling the discharging high CaO content lime product down to not less than substantially 1080 degrees Fahr. before it passes the water-cooling system is drawn in through the next to the lowermost tier of tunnel elements by the exhaust fan 84, which exhausts through the lowermost tier of tunnel elements.

Stoker-fired kiln

The kiln may be heated by the combustion of solid fuel such as coal, within the combustion-tempering chamber. For this purpose, an ordinary automatic stoker is preferably arranged to fire directly into such chamber. Under these conditions, the construction of the combustion-tempering chamber is somewhat modified.

The kiln partially illustrated in Figs. 11 and 12 is generally similar in construction to those of Figs. 1 through 4 and Figs. 9 and 10, like parts being indicated by like reference characters. The calcining chamber 110 and its directly associated structure is identical with those of the previously described embodiments, as is the variable discharge mechanism which is not here illustrated. The combustion-tempering chamber 121 is, however, modified to accommodate the stoker-firing and to properly distribute the gases of combustion resulting therefrom.

The stoker 185 is preferably of the underfeed type installed within a heat resistant sub-structure 186 disposed below and in front of the combustion-tempering chamber and substantially centrally of the length thereof. A refractory hood 187 extends from the outer wall 126 of the combustion-tempering chamber 121, substantially centrally thereof, and overhangs the sub-structure 186, in sealed contact therewith. The hood passage 188 extends from directly above the firepot 185a of the stoker to communication with the combustion-tempering chamber 121 laterally and centrally of the length, and adjacent the bottom thereof. As in the prior embodiments, the kiln and appurtenant structure rests upon a supporting framework, here indicated at 189.

Because the firing is accomplished centrally of the firing chamber 35, the various distributing baffles are differently placed than in the prior embodiments. Instead of a central opening leading upwardly into the main part of the combustion-tempering chamber, there is an elongated central baffle 190 for spreading the flames so they will pass upwardly through elongated openings 191 which flank the central baffle. Baffles 192 extend outwardly from the end walls 113a and 114a in horizontal alignment with central baffle 190, and aid in directing re-circulated gases, which enter the firing chamber 35 at opposite end thereof through conduits 193, upwardly through the openings 191 along with the products of combustion. The above-mentioned baffles, which collectively divide the firing chamber 35 from the remainder of the combustion-tempering chamber, need not be as heavy as are the corresponding baffles of the prior embodiments because the top wall of hood 187 first deflects the products of combustion.

The other deflecting baffles are arranged in pairs immediately below the intermediate tier of ports 123. The individual baffles 194 of each pair correspond to the baffles 40 of the prior embodiments, being spaced apart sufficiently to provide a restricted path leading directly to a port 123. The pairs of baffles are associated, respectively, with the ports.

To permit cleaning of fly ash from surfaces of the combustion-tempering chamber on which it would be likely to collect, covered cleanout openings may be provided through the walls at convenient locations, an example being the cleanout openings 195 through the end walls 113a and 114a affording access to the upper surfaces of the baffles 190 and 192.

Other uses

It has been convenient to here specifically illustrate and describe the invention in its particular application to various aspects of the lime producing industry, but, because of this, it must not be supposed that the advantages and utility of the invention are restricted to any one industry.

Broadly, the method and apparatus of the invention may be applied to the calcination of many materials. Thus, it can be seen that the specific disclosure merely exemplifies the possibilities inherent in the generic aspect of the invention. For example, the apparatus may be employed to calcine gypsum, cement, magnesite, alunite, clay, vermiculite, etc. It may also be employed with suitable minor modifications, which will be apparent to those skilled in the art, to process coal, oil shale, rock asphalt, metalliferous ores, phosphate rock, etc. In addition, it may be advantageously used to dry various materials, both inorganic and organic, all under carefully controlled conditions.

The present application constitutes a continuation in part of my copending application Serial No. 393,125, filed May 12, 1941, entitled "Device for treating granular materials," later abandoned, as well as a continuation in part of my copending application Serial No. 408,225, filed August 25, 1941, entitled "Feed and discharge controls," later abandoned. The first-mentioned copending application, Serial No. 393,125, itself constitutes a continuation in part of my prior application Serial No. 273,276, filed May 12, 1939, entitled "Device for treating granular materials," later abandoned.

The novel variable or differential discharge apparatus may be used in a variety of structural combinations, either for the feed or for the discharge of material. It forms the subject matter of my copending divisional application Serial No. 661,535, filed April 12, 1946, and entitled "Variable discharge mechanism."

Whereas specific forms of the apparatus of the invention are here illustrated and described, it should be understood that various changes may be made in such specific forms and various other forms may be produced by those skilled in the art to which this invention appertains, without departing from the spirit and generic scope of the invention as set forth herein and in the following claims.

Having fully described my invention, what I claim is:

1. A method of calcining, comprising substantially continuously passing material to be calcined through a calcining zone in the form of massed discrete pieces; subjecting the said material to calcination within said calcining zone, substantially throughout the transverse area of the mass thereof as it travels through said zone; and continuously discharging said material from said calcining zone variably at different locations substantially throughout both the length and the breadth of said transverse area of said mass in accordance with different quantities of calcining heat available at various locations throughout the said calcining zone.

2. A method of calcining, comprising substantially continuously passing material to be calcined through a calcining zone in the form of massed discrete pieces; subjecting the said material to calcination within said calcining zone, substantially throughout the transverse area of the mass thereof as it travels through said zone; discharging said material continuously from said calcining zone variably at different locations substantially throughout both the length and the breadth of said transverse area of said mass in accordance with different quantities of calcining heat available at various locations throughout the said calcining zone; and varying the said variable discharge from time to time in accordance with variations in calcining conditions.

3. A method of calcining, comprising substantially continuously allowing material to be calcined to descend through a calcining zone under the influence of gravity and in the form of massed discrete pieces; subjecting the said material to calcination within said calcining zone, substantially throughout the transverse area of the mass thereof as it travels through said zone; and continuously discharging said material from said calcining zone variably at different locations substantially throughout both the length and the breadth of said transverse area of said mass in accordance with different quantities of calcining heat available at various locations throughout the said calcining zone.

4. A method of calcining, comprising substantially continuously passing the material to be calcined through a calcining zone in the form of massed discrete pieces; creating gases of combustion outside said calcining zone, and tempering said gases; passing the tempered gases of combustion into said calcining zone; directing said tempered gases so they will substantially permeate and flow through the said massed discrete pieces of material, counter to the movement of said material; varying the size of the calcining zone from time to time in accordance with variations in physical characteristics of the material to be calcined; varying the tempering of said gases of combustion from time to time in accordance with variations in physical characteristics of the material to be calcined; discharging said material continuously from said calcining zone variably at different locations substantially throughout both the length and the breadth of said transverse area of said mass in accordance with different quantities of calcining heat available at various locations throughout the said calcining zone; and varying the said variable discharge from time to time in accordance with variations in calcining conditions.

5. A method of calcining, comprising substantially continuously passing material to be calcined through a calcining zone in the form of massed discrete pieces; creating gases of combustion outside said calcining zone but immediately adjacent thereto; passing the gases of combustion into said calcining zone as the material passes therethrough; directing said gases so they will permeate and flow through substantially the entire mass of said material, counter to the movement of said material; and continuously discharging the calcined material from said calcining zone variably at different locations substantially throughout both the length and the breadth of the transverse area of said mass in accordance with different quantities of calcining heat available at various locations throughout the said calcining zone.

6. A method of calcining, comprising substantially continuously passing material to be calcined through a calcining zone in the form of massed discrete pieces; subjecting the said material to calcining temperatures within the said calcining zone and substantially throughout the transverse area of the mass; varying the size of the calcining zone from time to time in accordance with variations in physical characteristics of the material to be calcined; discharging said material continuously from said calcining zone variably at different locations substantially throughout both the length and the breadth of said transverse area of said mass in accordance with different quantities of calcining heat available at various locations throughout the said calcining zone; and varying the said variable discharge from time to time in accordance with variations in calcining conditions.

7. Calcining apparatus, comprising walls defining a calcining chamber; a hopper engaging said walls in a substantially gas-tight manner, and rising above said calcining chamber, for holding a supply of massed discrete pieces of material to be calcined and for substantially continuously feeding said material to said calcining chamber; walls defining enclosed chamber means laterally of and immediately adjacent to said calcining chamber; combustion means arranged for firing said chamber means; means disposed within said calcining chamber for maintaining the mass of said material in a loose condition during its descent through the calcining chamber; means for passing gases of combustion from the said chamber means substantially uniformly into and throughout the said mass of material as it descends through the said calcining chamber; means for exhausting said gases of combustion from the calcining chamber following their passage through the said mass of material; means for controlling the passage of said gases of combustion from said chamber means through said material, and the exhaust of said gases from said calcining chamber; and means operative to continuously discharge the calcined material from said calcining chamber variably at different locations substantially throughout both the length and the breadth of the transverse area of said calcining chamber.

8. Calcining apparatus, as recited in claim 7, wherein means are provided for varying the size of said calcining chamber from time to time in accordance with changing piece-size of the material to be calcined; and wherein means are provided for varying the said variable discharge from time to time in accordance with variations in calcining conditions.

9. Calcining apparatus, as recited in claim 7, wherein the said means for controlling the discharge of calcined material from the calcining chamber comprises a plurality of downwardly directed, individual, discharge spouts; a plurality of stop means spaced directly below the said discharge spouts, respectively, and arranged to normally stop discharge flow of calcined material therefrom; individual movable means associated with said stop means, respectively, and arranged for causing controlled discharge from said discharge spouts, respectively, variably along the lengths thereof; and means for adjusting the movements of said movable means variably relative to one another so as to produce said controlled discharge variably relative to one another.

10. Calcining apparatus, as recited in claim 7, wherein means are provided for drawing cooling air into and through the mass of calcined material prior to the discharge of same from the said calcining apparatus, and for exhausting said cooling air from said calcining apparatus before it has a chance to mingle with the gases of combustion within the calcining chamber, and wherein means are provided for exhausting from the upper part of said calcining apparatus any air which filters in through said hopper with the material fed, whereby gas having a high $CO_2$ content may be withdrawn from said calcining chamber by said means for exhausting the gases of combustion.

11. Calcining apparatus, as recited in claim 7, wherein bin means for the storage of material to be calcined is spaced above the said hopper and has at least one open gravity discharge spout leading into the hopper and arranged to automatically feed the said material into the hopper by gravity, the space between said bin means and said hopper being freely open to the atmosphere, whereby the material within said hopper is automatically and continuously maintained at a substantially constant level, and any inflow of air which does occur with the feed of material into said calcining chamber will be substantially uniform during the operation of the calcining apparatus.

12. Calcining apparatus, comprising walls defining a calcining chamber; a hopper engaging said walls in a substantially gas-tight manner, and rising above said calcining chamber, for holding massed discrete pieces of material to be calcined and for substantially continuously feeding said material to said calcining chamber; a plurality of feed chutes formed across the bottom of said hopper and leading from said hopper into said calcining chamber, said feed chutes being adjustable upwardly and downwardly for varying the size of said calcining chamber from time to time in accordance with changing piece-size of the material to be calcined; means for adjusting the said feed chutes; an approximately corresponding number of discharge chutes formed across the bottom of said calcining chamber; respective means associated with said discharge chutes for discharging material variably at different locations along the lengths of the respective discharge chutes; and adjustable means for variably actuating said respective discharge means relative to one another.

13. Calcining apparatus, comprising walls defining a calcining chamber; a hopper engaging said walls in a substantially gas-tight manner, and rising above said calcining chamber, for holding massed discrete pieces of material to be calcined and for substantially continuously feeding said material to said calcining chamber; and bin means for the storage of said material to be calcined, said bin means being spaced above said hopper and having at least one open gravity discharge spout leading into said hopper so as to automatically feed the material into the hopper by gravity, the space between said bin means and said hopper being freely open to the atmosphere, whereby the material within said hopper is automatically and continuously maintained at a substantially constant level, and any inflow of air which does occur with the feed of material into said calcining chamber will be substantially uniform during the operation of the calcining apparatus.

14. A continuous kiln for treating granular materials, comprising a walled chamber; a feed hopper to introduce material evenly in said chamber; variable spouts mounted in said hopper and leading into said chamber; racks secured to said variable spouts; pinions meshing with said racks; means to rotate said pinions to vary the height of said variable spouts relative to said chamber; separate discharge openings in the bottom of said chamber; and means to control the discharge from each opening independently of each other to vary the speed, through any part of the chamber, of the flow of material as required to make an evenly treated product.

15. Apparatus for continuously treating materials, comprising walls defining a substantially vertically disposed treating chamber; a hopper disposed above said chamber and adapted to continuously feed material thereinto by gravity flow, said hopper being open at its top and adapted, when filled with material, to close the top of said treating chamber; downwardly directed feed spout means forming a part of said hopper and leading into said chamber; means for adjusting the length of said feed spout means relative to said chamber so the treating capacity of said chamber is increased or decreased accordingly; material-supplying bins spaced above said hopper and adapted to discharge additional material thereinto by gravity flow to compensate for material fed into said treating chamber; and means for continuously discharging treated material from the bottom of said chamber, said discharging means comprising individual discharge devices adapted for actuation mutually differentially so that material passing through said chamber may be discharged at relatively different speeds at various locations throughout the transverse sectional area of said chamber, adjustable control means for determining the relative actuation of said discharge devices, and means for actuating said individual discharge devices substantially simultaneously.

16. Apparatus for continuously treating materials, comprising walls defining a substantially vertically disposed treating chamber, hopper means disposed above said treating chamber and adapted to continuously feed material thereinto, said hopper means serving, at least in part, to close and substantially seal the top of said treating chamber, feed spout means forming a part of said hopper means, means for adjusting the length of said feed spout means relative to said treating chamber so the treating capacity of said treating chamber is increased or decreased accordingly, and means for continuously discharging treated material from the bottom of said treating chamber, said discharging means comprising individual discharge devices adapted for actuation mutually differentially so that material passing through said treating chamber may be discharged at relatively different speeds at various locations throughout the transverse sectional area of said treating chamber, adjustable control means for determining the relative actuation of said discharge devices, and means for actuating said individual discharge devices substantially simultaneously.

17. Calcining apparatus, as recited in claim 7, wherein means is provided for drawing cooling air into and through the mass of calcined material prior to the discharge of same from the said calcining apparatus, and for exhausting said cooling air from said calcining apparatus before it has a chance to mingle with the gases of combustion within the calcining chamber, whereby gas having a high $CO_2$ content may be withdrawn from said calcining chamber by said means for exhausting the gases of combustion.

18. Calcining apparatus, as recited in claim 7, wherein means is provided for drawing cooling air into and through the mass of calcined material prior to the discharge of same from the said calcining apparatus, and for exhausting said cooling air from said calcining apparatus before it has a chance to mingle with the gases of combustion within the calcining chamber; wherein means is provided for exhausting from the upper part of said calcining apparatus any air which filters in through said hopper with the material fed, whereby gas having a high $CO_2$ content may be withdrawn from said calcining chamber by said means for exhausting the gases of combustion; and wherein means is provided for recirculating a portion of said high $CO_2$ content gases to the combustion chamber.

19. Calcining apparatus, as recited in claim 7, wherein means is provided for drawing cooling air into and through the mass of calcined material prior to the discharge of same from the said calcining apparatus, and for exhausting said cooling air from said calcining apparatus before it has a chance to mingle with the gases of combustion within the calcining chamber, whereby gas having a high $CO_2$ content may be withdrawn from said calcining chamber by said means for exhausting the gases of combustion, and wherein means is provided for recirculating a portion of said high $CO_2$ content gases to the combustion chamber.

20. A method of calcining comprising maintaining a calcining zone; maintaining above the calcining zone a supply of massed discrete pieces of material to be calcined so that gravity flow of material from said supply will automatically replace material flowing from the calcining zone; allowing the material to be calcined to flow through the calcining zone and to discharge therefrom under the influence of gravity; stopping the said gravity discharge of material at a location spaced below the calcining zone so that said calcined material is piled at natural angles of repose; and differentially flowing the said material through the calcining zone in accordance with the calcining heat available differentially throughout said zone, by differentially removing portions of said piled material laterally thereof as required.

21. The method recited in claim 20 wherein the differential removal of portions of said piled material is carried on continuously so the differential flowing of material through the calcining zone and the flowing of fresh material thereto from said supply is continuous, and wherein is included the replenishing of said supply of material from time to time before exhaustion thereof.

22. The method recited in claim 21 wherein the calcining heat is introduced into the body of the differentially flowing stream of material within the calcining zone along groups of spaced elongated paths staggered at different levels; wherein the gravity discharge of material is constrained to occur within a plurality of spaced elongated discharge zones conforming in general to the said paths of heat flow so that a corresponding plurality of elongated piles of calcined material is obtained; and wherein the differential removal of portions of the piled material is carried out along the respective lengths of each of the said piles.

23. Calcining apparatus comprising a calcining chamber; means for supplying heat thereto; hopper means for maintaining a supply of massed discrete pieces of material to be calcined, said hopper means opening into the upper part of the calcining chamber so said material may flow into the latter under the influence of gravity; gravity discharge means formed in the lower part of the calcining chamber for allowing said material to flow out of the calcining chamber under the influence of gravity; stop means spaced below said gravity discharge means for receiving and stopping discharge of material by allowing material to pile up thereon at natural angles of repose; and differential material-removing means associated with said stop means for removing material therefrom differentially throughout the said piled material.

24. Calcining apparatus in accordance with claim 23, wherein the means for supplying heat to the calcining chamber include groups of elongated tunnel elements extending transversely across the calcining chamber at different levels, the tunnel elements of one level being staggered in position relative to those of an adjacent level; wherein the gravity discharge means comprise a plurality of elongated openings corresponding generally to the said tunnel elements; wherein the stop means comprise elongated material-receiving surfaces positioned below respective discharge openings; and wherein the differential material-removing means comprise individual, differential, material-displacement means operably associated with the respective material-receiving surfaces.

25. A method of calcining, comprising substantially continuously passing material to be calcined through a calcining zone in the form of massed discrete pieces; subjecting the said material to calcination within said calcining zone, substantially throughout the transverse area of the mass thereof as it travels through said zone; dividing the said transverse area of the mass into a plurality of elongate sections which lie side-by-side and extend across the said transverse area; and discharging from the several sections, differentially with respect to one another, and from each of said sections differentially, at numerous locations along the respective lengths thereof, all in accordance with different quantities of calcining heat available at various locations throughout the said transverse area of the mass within the calcining zone.

26. Calcining apparatus comprising a calcining chamber; means for supplying heat thereto; hopper means for maintaining a supply of massed discrete pieces of material to be calcined, said hopper means opening into the upper part of the calcining chamber so said material may flow into the latter under the influence of gravity; gravity discharge means formed in the lower part of the calcining chamber for allowing said material to flow out of the calcining chamber under the influence of gravity, said discharge means comprising a plurality of elongate discharge openings extending side-by-side across the transverse area of said calcining chamber at the bottom thereof; a corresponding plurality of elongate differential discharge devices associated with the respective discharge openings, said discharge devices including respective stop means spaced below the said discharge openings for receiving and stopping discharge of material by allowing said material to pile up thereon at natural angles of repose, respective material-displacement means, and respective sets of individually-adjustable control elements arranged for independent adjustment within each set and between the several sets; and drive means operable on said control elements in common.

27. Calcining apparatus comprising a calcining chamber; means for supplying heat thereto; hopper means for maintaining a supply of massed discrete pieces of material to be calcined, said hopper means opening into the upper part of the calcining chamber so said material may flow into the latter under the influence of gravity; gravity discharge means formed in the lower part of the calcining chamber for allowing said material to flow out of the calcining chamber under the influence of gravity, said gravity discharge means comprising a plurality of elongate discharge openings extending side-by-side across the transverse area of said calcining chamber at the bottom thereof; a corresponding plurality of elongate stop means disposed under the respective discharge openings in spaced relation thereto for receiving and stopping discharge of material by allowing said material to pile up thereon at natural angles of repose; and differential material-removing means associated with said stop means for removing material therefrom differentially throughout the said piled material, said differential material-removing means comprising a corresponding plurality of elongate material-displacement elements disposed between the respective discharge openings and the respective stop means, and reciprocative drive means provided with independently adjustable drive connections for effecting relative movement between said stop means and said material-displacement elements.

THOMAS R. ELLERBECK.

REFERENCES CITED

The following references are of record in the file of this patent:

UNITED STATES PATENTS

| Number | Name | Date |
|---|---|---|
| 143,450 | Henegan | Oct. 7, 1883 |
| 358,437 | Druecher et al. | Mar. 1, 1887 |
| 669,411 | Ginterman | Mar. 5, 1901 |
| 799,001 | Grondal | Sept. 5, 1905 |
| 1,482,677 | Dunten | Feb. 15, 1924 |
| 1,533,572 | Richards | Apr. 14, 1925 |
| 1,610,906 | Ward | Dec. 14, 1926 |
| 1,627,215 | Truesdell | May 3, 1927 |
| 1,785,427 | Smith | Dec. 16, 1930 |
| 1,798,802 | Niles | Mar. 31, 1931 |
| 1,895,284 | Hay | Jan. 24, 1933 |
| 1,940,246 | Clark et al. | Dec. 19, 1933 |
| 1,973,191 | Wiltfong | Sept. 11, 1934 |
| 2,047,064 | Gillette | July 7, 1936 |
| 2,108,118 | Greenwalt | Feb. 15, 1938 |
| 2,113,522 | Walker | Apr. 15, 1938 |
| 2,112,502 | McNitt | May 29, 1938 |
| 2,167,120 | Lloyd | July 25, 1939 |
| 2,199,384 | Azbe | May 7, 1940 |
| 2,280,571 | Dionisotti | Apr. 21, 1942 |
| 2,282,584 | Hill | May 12, 1942 |

FOREIGN PATENTS

| Number | Country | Date |
|---|---|---|
| 501,249 | England | Feb. 23, 1939 |